United States Patent
Banwell et al.

(10) Patent No.: US 8,351,799 B2
(45) Date of Patent: Jan. 8, 2013

(54) MULTISCALE SAMPLING FOR WIDE DYNAMIC RANGE ELECTRO-OPTIC RECEIVERS

(75) Inventors: Thomas Banwell, Howell, NJ (US); Anjali Agarwal, Matawan, NJ (US); Janet Jackel, Holmdel, NJ (US); Paul Toliver, Tinton Falls, NJ (US); Ted K. Woodward, Holmdel, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 542 days.

(21) Appl. No.: 12/573,996

(22) Filed: Oct. 6, 2009

(65) Prior Publication Data

US 2010/0111545 A1    May 6, 2010

Related U.S. Application Data

(60) Provisional application No. 61/103,122, filed on Oct. 6, 2008.

(51) Int. Cl.
*H04B 10/00* (2006.01)
(52) U.S. Cl. .................. 398/193; 398/198; 398/194
(58) Field of Classification Search ........... 398/192–198
See application file for complete search history.

(56) References Cited

U.S. PATENT DOCUMENTS

| | | | |
|---|---|---|---|
| 4,156,809 A * | 5/1979 | Phillips | 398/141 |
| 4,742,576 A | 5/1988 | McMahon | |
| 5,173,794 A | 12/1992 | Cheung et al. | |
| 5,347,392 A | 9/1994 | Chen et al. | |
| 5,440,415 A | 8/1995 | Mekani et al. | |
| 5,715,075 A | 2/1998 | Tanaka et al. | |
| 6,407,846 B1 | 6/2002 | Myers et al. | |
| 6,845,108 B1 | 1/2005 | Liu et al. | |
| 7,251,290 B2 * | 7/2007 | Rashev et al. | 375/296 |
| 7,266,306 B1 * | 9/2007 | Harley et al. | 398/182 |
| 7,701,842 B2 * | 4/2010 | Roberts et al. | 370/210 |
| 8,059,970 B2 * | 11/2011 | Harley et al. | 398/198 |
| 2003/0032397 A1 * | 2/2003 | Kuechler et al. | 455/127 |
| 2006/0078336 A1 * | 4/2006 | McNicol et al. | 398/147 |
| 2010/0092181 A1 * | 4/2010 | Roberts et al. | 398/159 |
| 2010/0111545 A1 * | 5/2010 | Banwell et al. | 398/208 |

OTHER PUBLICATIONS

Banwell, T., et al., "Analytical expression for large signal transfer function of an optically filtered analog link". Optics Express, vol. 17, No. 18, Aug. 31, 2009.
Minasian, R., "Photonic Signal Processing of Microwave Signals." IEEE Transactions on Microwave Theory and Techniques, vol. 54, No. 2, Feb. 2006.
Capmany, J., "A Tutorial on Microwave Photonic Filters." Journal of Lightwave Technology, vol. 24, No. 1, Jan. 2006.
Agarwal, A., et. als. "Multiscale Sampling for Wide Dynamic Range Electro-optic Receivers." Conference on Optical Fiber Communication, San Diego, CA, Mar. 22-26, 2009, p. 1-3.
International Search report dated Jul. 1, 2008.

* cited by examiner

*Primary Examiner* — Agustin Bello
(74) *Attorney, Agent, or Firm* — Philip J. Feig

(57) ABSTRACT

A method for multiscale sampling for wide dynamic range electro-optic receivers is presented. The method comprises obtaining a signal, reproducing the signal into first and second signals, scaling one signal with respect to the other, modulating both signals with the same modulation function, and utilizing the resulting vector response function to invert the response of the link over a greater dynamic range than would otherwise be possible with a single instance of the modulated signal. The sealed modulation response may be obtained by splitting the signal into two polarizations and utilizing a modulator having different response for the two polarizations, or by utilizing two modulators.

5 Claims, 4 Drawing Sheets

MULTISCALE SAMPLING FOR WIDE DYNAMIC RANGE ELECTRO-OPTIC RECEIVERS

CROSS REFERENCE TO RELATED APPLICATIONS

The present invention claims the benefit of U.S. provisional patent application 61/103,122 filed Oct. 6, 2008, the entire contents and disclosure of which are incorporated herein by reference as if fully set forth herein.

This application is related to commonly-owned, co-pending U.S. patent application Ser. No. 12/109,047 filed on Apr. 24, 2008, the entire contents and disclosure of which is expressly incorporated by reference as if fully set forth herein.

GOVERNMENT LICENSE RIGHTS

This invention was made with Government support under HR0011-08-C-0026 awarded by the Defense Advanced Research Projects Agency (DARPA). The Government has certain rights in this invention.

FIELD OF THE INVENTION

The present invention relates generally to multi-scale sampling for wide dynamic range electro-optic receivers.

BACKGROUND OF THE INVENTION

Microwave photonic links have been studied extensively due to their growing applications at high frequencies in commercial and defense communications such as CATV, antenna remoting, avionics, synthetic aperture radar, phased array antenna, etc. Radio frequency (RF) photonics is attractive for both transmission and signal processing. RF signal processing applications such as channelizing receivers provide the opportunity for optics to perform the challenging task of transforming wideband spectral processing at high frequencies in the RF domain into narrowband processing in the optical domain with reduced complexity.

Analog photonic links employ either intensity modulation or phase modulation for electrical-to-optical (E/O) conversion and are limited in linearity primarily due to the sinusoidal transfer function of the intensity modulator or due to the nonlinear optical-to-electrical (O/E) conversion at the receiver for phase modulated signals. The two-tone spurious free dynamic range (SFDR) is limited mainly by third-order intermodulation distortion (IMD), which falls within the signal band.

The utility of analog links depends upon various parameters including link gain, noise figure, bandwidth, and link linearity or dynamic range. High dynamic range is key to achieving high fidelity analog links and places highly challenging requirements on the components and the design of the system. The linearity of the link can be characterized by the SFDR and is primarily dependent on the modulation and detection scheme. Both intensity modulation using direct detection and phase modulation using either direct detection or coherent detection have been studied. All these links exhibit a nonlinear transfer function and are thus limited in their linearity. Besides modulation and detection, the characteristic of the nonlinearity also depends on whether the link employs filtering.

Both optical and electronic methods to extend the dynamic range have been proposed and demonstrated. Electronic methods involve electronic predistortion while optical methods include cascaded modulators for predistortion, optical spectrum shaping, optical phase locked loops (PLL), and coherent post-processing. Significant reduction in the intermodulation distortion has been achieved using these methods. Predistortion techniques require knowledge of the nonlinearity and may employ adaptive circuits to track changes in the input signal. Predistortion techniques are limited in their efficacy when multiple distortion mechanisms are present as they require as many separate circuits to correct for the nonlinearities as the number of distortions.

Post-processing methods, which are extensively used in applications such as software defined radio (SDR), can correct simultaneously for multiple distortions. Advantageously, digital signal processing (DSP) capability is already present in many applications to perform standard processing functions. However, the post-processing methods, such as an electro-optical PLL, rely on having access to the entire modulated signal in order to compensate for link nonlinearity and reconstruct the original transmitted signal. However, RF signal processing applications channelize a smaller spectrum of the modulated signal thus precluding these techniques.

SUMMARY OF THE INVENTION

A novel multiscale sampling technique for extending dynamic range of a phase-modulated analog optical system employing passband signals, e.g., optically filtered E/O/E links, is presented. In combination with digital post-processing based on inverting the transfer function, the novel technique corrects nonlinear distortions.

The inventive method for multiscale sampling for wide dynamic range electro-optic receivers comprises steps of obtaining an input signal, producing a first signal using an optical modulator and detector, producing a second signal using the optical modulator and detector, and correcting nonlinear distortions in a modulation and detection response using the first and second signals, wherein the signals are scaled with respect to the input signal amplitude. In one embodiment, two optical modulators are used. The first and second signals can be produced using optical polarization. The first and second signals can employ an optical filter. In one embodiment, the step of correcting nonlinear distortions is perfoiuted by a computer readable program stored on computer readable medium.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

Figure 1:
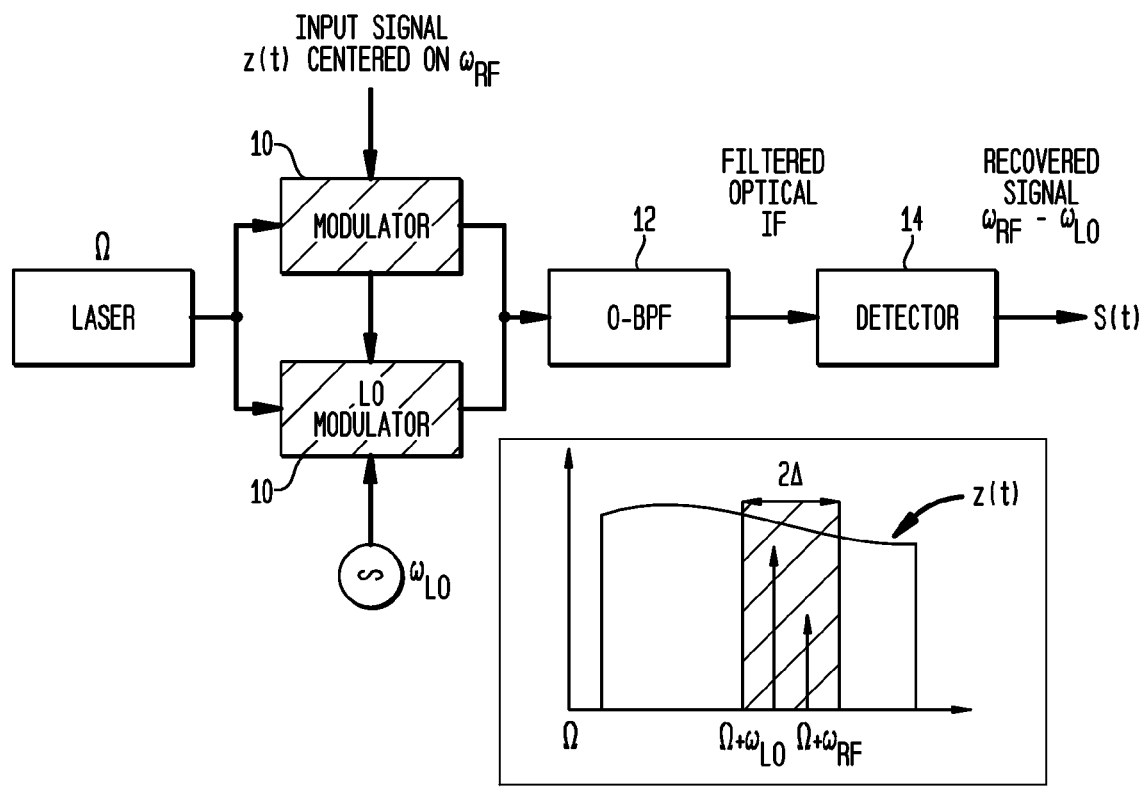
FIG. 1 shows an optically filtered analog photonic link.

FIG. 1 illustrates an optically filtered analog photonic system. This exemplary system has modulators 10, including an LO modulator, a filter 12, e.g., O-BPF, and a detector 14. The output of a continuous wave (cw) laser is split between the signal and the local oscillator (LO) paths. The signal path is phase modulated by an RF signal z(t) centered at frequency $\omega_{RF}$, while the LO path is phase modulated by a sinusoidal signal at frequency $\omega_{LO}$. z(t) is a quadrature passband signal represented in quadrature components x(t) and y(t) as z(t)=x(t)sin($\omega_{RF}$t)+y(t)cos($\omega_{RF}$t). Apart from the fundamental optical frequency, numerous sideband frequency components are generated. The two phase modulated signals are combined and then optically filtered to reject the higher order harmonics. The bandwidth of the optical filter is 2Δ in order to retain just the first upper sideband of both the signals which includes the intermodulation distortion within that band.

At the receiver the LO signal is used to coherently downconvert to an intermediate frequency $\omega_{IF}=(\omega_{RF}-\omega_{LO})$ resulting in the detected electrical signal S(t). The expression for the recovered signal S(t) can be derived as $$S(t) \propto \text{Re}\left\{\frac{1}{2}(x+iy)\frac{2J_1(r)}{r}e^{j(\omega_{RF}-\omega_{LO})t}\right\} = \quad (1)$$
$$A(x\cos\omega_{IF}t - y\sin\omega_{IF}t)\frac{2J_1(r)}{r}$$

where A is a constant, $r(t)^2 \equiv x(t)^2 + y(t)^2$, $J_1(r)$ is the first order Bessel function of the first-kind.

Equation (1) is valid for all quadrature passband-signals z(t). If z(t) is a simple two-tone signal with component frequencies ($\omega_{RF} \pm \Delta$), z(t)=2β cos(Δt)sin($\omega_{RF}$t). Where β is the modulation depth, S(t) simplifies to:

$$S(t)=A.J_1(2\beta\cos(\Delta t))\,e^{i(\omega_{RF}-\omega_{LO})t} \quad (2)$$

System linearity limits the ability to recover small signals in the presence of large amplitude interference. If the transfer function of a modulator is known, its response can be numerically inverted to effectively linearize the behavior of the modulator, as described below. Phase modulation (PM) is an effective method to create an optical sideband from an RF signal for use in coherent optical signal processing. The sideband amplitude is given by $y=J_1(r)$ for a sinusoidal modulation amplitude r, nearly independent of the hardware implementation.

Figure 2:
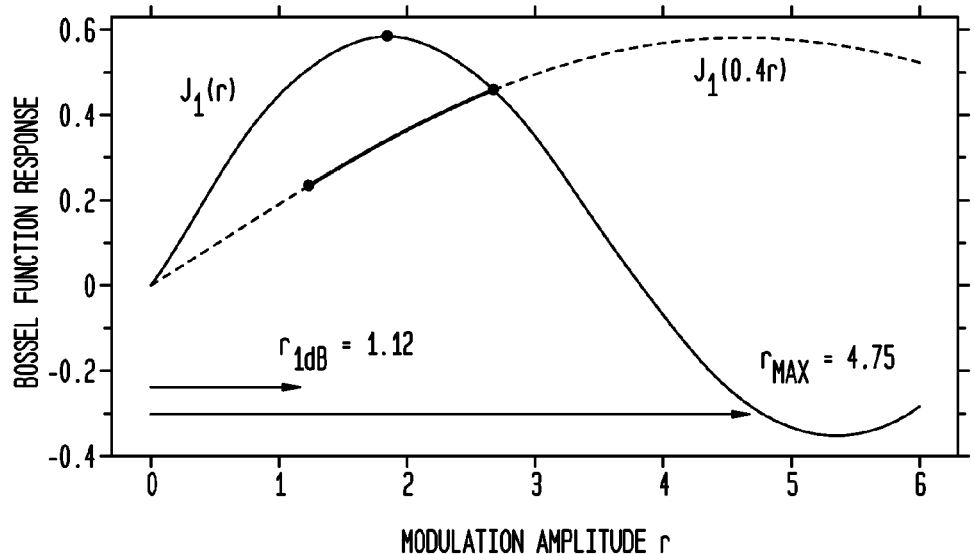
FIG. 2 is a graph illustrating multiscale sampling.

The distortion is well defined by the properties of $J_1(r)$ and can be compensated using DSP to solve for r. FIG. 2 illustrates the behavior of $J_1(r)$. The linear range extends from about r=0 to about r=1.12 (1 dB gain compression). The distortion is well defined by the properties of $J_1(r)$ and can be mitigated using pre-distortion or using DSP to solve $y=J_1(r)$ after detection.

The inversion of $J_1(r)$ is limited to regions for which the slope of $J_1(r)$ is nonzero, such as r<1.8 in FIG. 2. A second measurement of the RF signal can be used to remove the ambiguity in $J_1(r)$. The inventive method of multiscale sampling extends the inversion region where the slope vanishes, e.g., beyond r=1.8, using a second measurement of the RF signal with a scaled response, for example $J_1(0.4r)$. With this, the vector function ($J_1(r)$, $J_1(0.4r)$) can be inverted unambiguously for all r<4.75, providing a wide improvement in useable dynamic range. This gives $$\langle s_1^2(t)\rangle = 2(A_1/\beta_1)^2 J_1^2(\beta_1 r)$$
$$\langle s_2^2(t)\rangle = 2(A_2/\beta_2)^2 J_1^2(\beta_2 r) \quad (3)$$

where $\langle s^2(t)\rangle = \int w(t-\xi)S(\xi)^2 d\xi$ with window W(t), and $\beta_1, \beta_2$ are modulation depths for the two measurements.

Denoting the vector $\vec{s}(t)=(S_1(t), S_2(t))$, the original signal can then be reconstructed from Eq. (1) as follows:

$$\vec{CS}(t)\frac{r}{J_1(r)} = \vec{CS}(t)\frac{\sqrt{J_1^{-1}(\langle \vec{s}^2\rangle)}}{|\vec{S}|} \quad (4)$$

where C is another constant and two measurements of S(t) are available from multiscale sampling.

Such an operation requires two copies of the signal, each modulated at different scale factors. This can be obtained by duplicating or replicating the entire signal chain by use of two optical modulators driven with scaled copies of the signal, passed through two matching filters, and imposing the signal on two detectors. Alternatively, using a filter with a periodic response (i.e. free spectral range (FSR)) can facilitate the use of a single filter element by passing two versions of the modulated signal through the filter at two different frequencies corresponding to adjacent FSR resonances. To accomplish this, two laser frequencies are used to modulate the signals such that they pass through adjacent filter resonances. This reduces the number of filters required to execute the method. The close spacing of filter resonances is necessary so that system response can be assumed constant for the two scaled modulation signals.

Further simplification of the system is possible if a modulator having different response for different optical polarization is employed and the signal is split between these polarizations as it is supplied to the modulator, thus permitting a single modulator to be employed. Subsequent filtering would require diversity if filters were polarization sensitive, or simplex were they not sensitive.

An example of this method is now presented. In order to obtain two measurements for multiscale sampling, the different electro-optic coefficients for the transverse electrical (TE) and transverse magnetic (TM) polarizations in a lithium niobate (LiNbO$_3$) phase modulator are used, giving different modulation depth for the same RF drive. In a z-cut LiNbO$_3$ phase modulator, the electro-optic coefficient for the TE polarization is ⅓ that of the TM polarization. The response of the modulator to these two polarizations is thus a simple relative scaling. The optical signal from the cw laser is launched in two orthogonal polarizations in the signal path with equal optical power in the two polarizations. In the LO path, the optical signal is launched in a single polarization (TM). At the receiver measurement on either the TE or TM, polarization can be made by aligning the LO and the signal polarizations.

The output power of a 1550 nm laser is first amplified to 16 dBm using an erbium-doped fiber amplifier (EDFA) and then split between the signal and the LO paths for phase modulation. The phase modulators have a $V_\pi$ of 4 V. The RF modulating signal z(t) is two-tones at frequencies 4.999 GHz and 5.001 GHz spaced by 2Δ=2 MHz and is obtained from two separate synthesizers that are passively combined. The power of the two-tone signal is boosted using an RF amplifier. The RF amplifier adds its own IMD3 terms. A third synthesizer is used for the LO RF signal at $\omega_{LO}$=5.055 GHz. The phase modulated optical signals are combined, after which a narrowband optical filter with a 3-dB bandwidth of 350 MHz filters the upper sideband fundamental around 5 GHz. For each polarization, the filtered output is coherently detected. This results in the recovered signal S(t) around an IF of $\omega_{IF}$=55 MHz, which is monitored on an RF spectrum analyzer and recorded on a 20 GSa/s real-time scope (2.5 GHz bandwidth).

Figure 3:
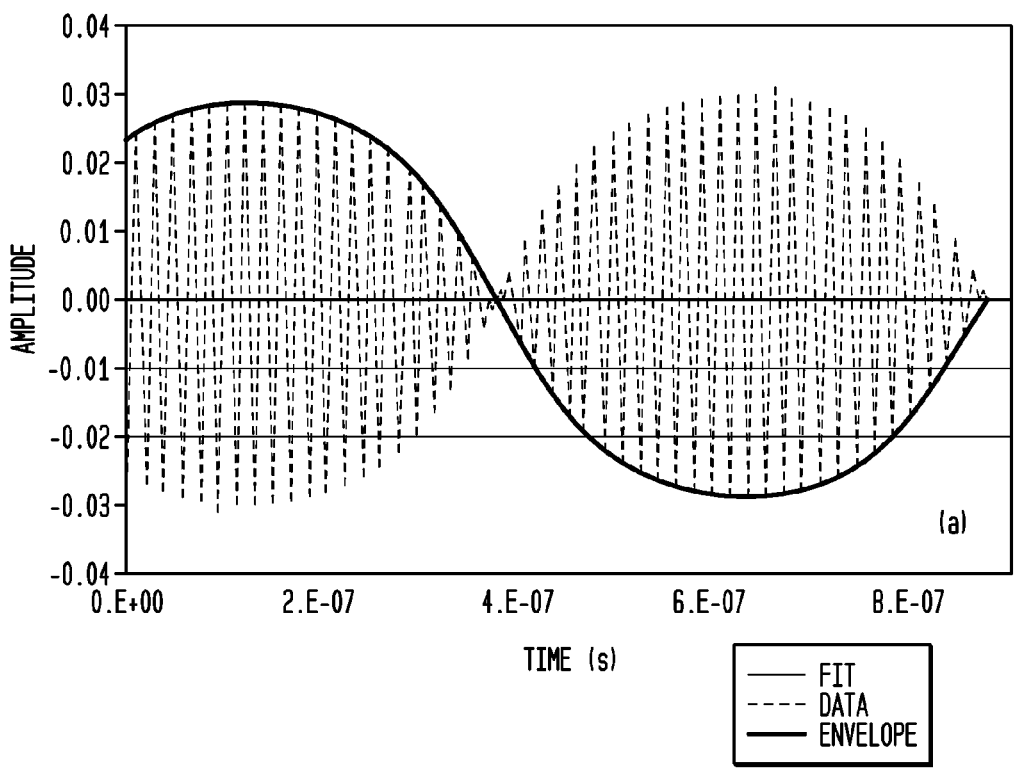
FIG. 3 shows a time domain waveform with TE polarization.
Figure 4:
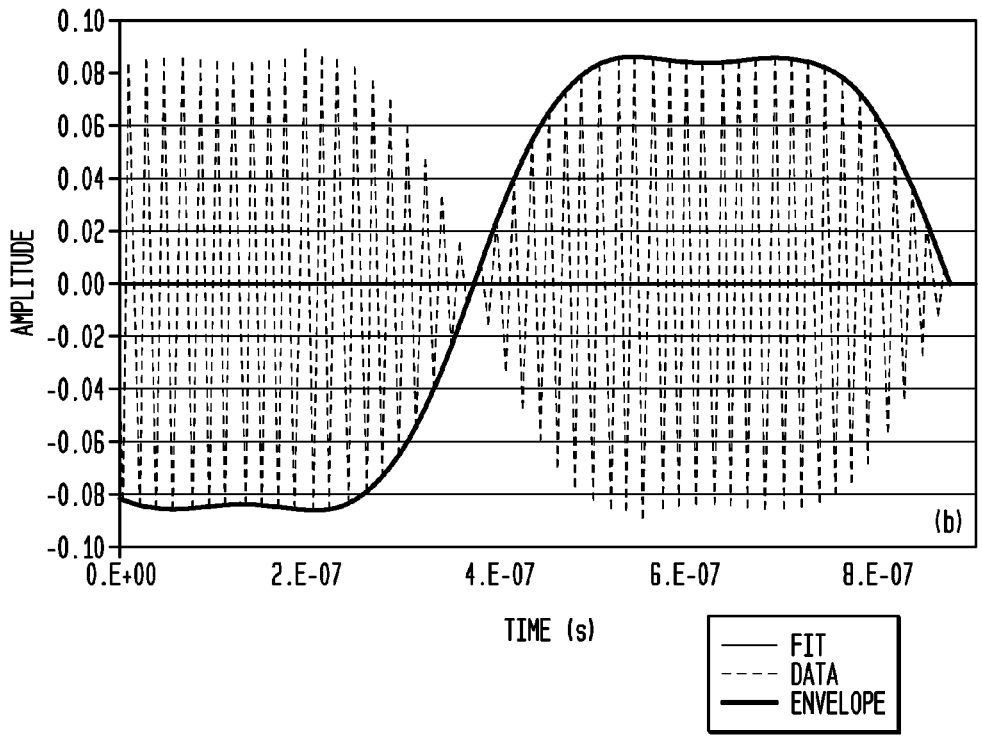
FIG. 4 shows a time domain waveform with TM polarization.

FIGS. 3 and 4 show the time-domain recovered signal for both polarizations for an RF input power of 16.3 dBm (per tone). Equation (2) is fit to this illustrative data showing excellent agreement and confirming the analysis. The envelope given by $J_1(2\beta \cos \Delta t)$ is also shown. The compression in the TM waveform shown in FIG. 4 clearly indicates the effect of distortion, while the TE waveform shown in FIG. 3 has much lower distortion due to its lower electro-optic coefficient.

Figure 5:
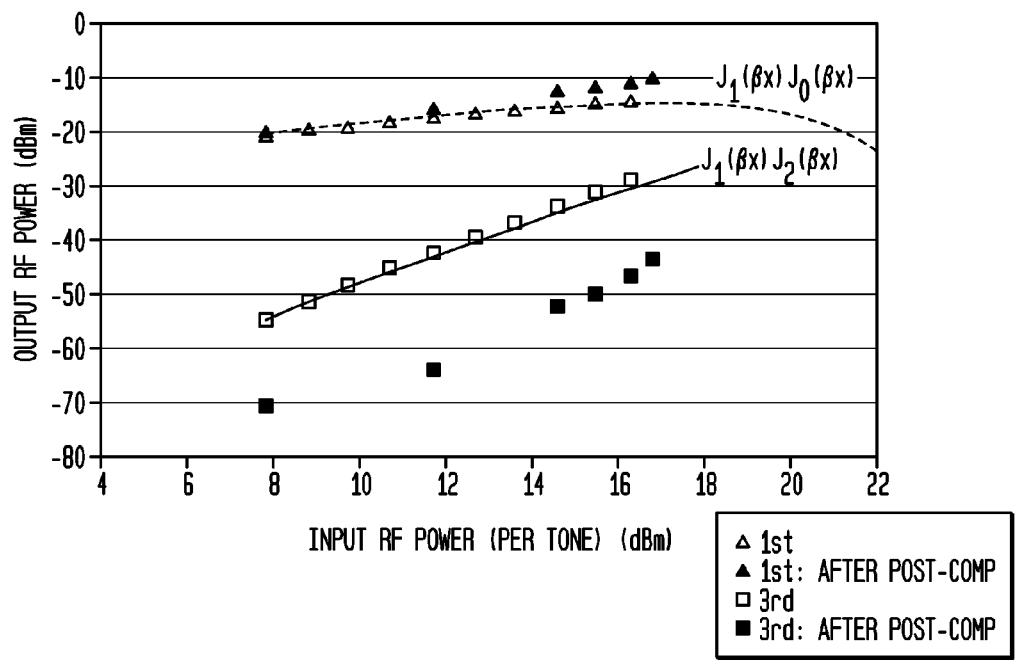
FIG. 5 shows IF output power of the fundamental and IMD3 plotted as a function of the input RF power, shown for TM polarization only for clarity.

The RF spectrum consists of the fundamental two-tones (at $\omega_{IF}\pm\Delta$) along with the dominant IMD3 terms (at $\omega_{IF}\pm 3 \Delta$). FIG. 5 shows the IF output power of the fundamental and the IMD3 is plotted as a function of the input RF power (per tone). For clarity, FIG. 5 shows data recovered from TM polarization modulation only. The dotted lines in FIG. 5 are obtained through a least squares regression (LSR) fit of $J_1(\beta x) J_0(\beta x)$ on the fundamental. The corresponding IMD3 that goes as $J_2(\beta x)J_1(\beta x)$ is also plotted and agrees with the data. Next, DSP is applied to compensate for the nonlinear distortion. The resulting fundamental and IMD3 after post-processing are also shown in FIG. 5. It is seen that post-processing results in significant suppression of IMD3 even for high RF input powers and in the region when the derivative of $J_1(r)$ goes to zero, where the TE polarization measurements are used for inverting the response.

Figure 6:
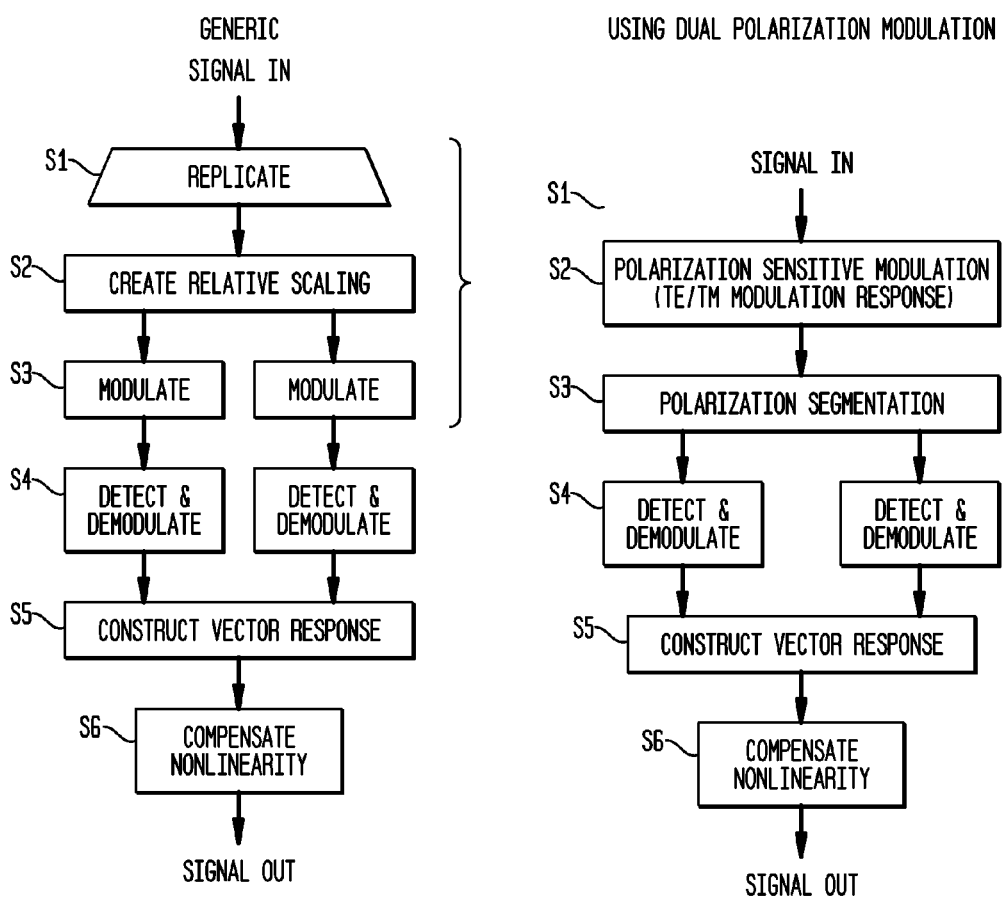
FIG. 6 shows a block diagram of the functions to be performed.

FIG. 6 is a block diagram of the method in an exemplary embodiment. In the general case, the signal is split (S1), scaled (S2), modulated (S3), and detected/demodulated (S4). From the demodulated respones, the vector response function described herein is constructed (S5) and employed to invert the transfer function presented here and the output signal is obtained (S6). In a simplified case, the scaled response is obtained by passing it through a modulator whose response has a known polarization dependence, combining steps S1, S2 and S3 in a single physical embodiment. The resulting output is detected and demodulated in both polarizations through appropriate control of the local oscillator polarization. The resulting vector response function is then constructed and inverted in the same manner as in the general case.

The inventive method enables increased sensitivity, that is, more sensitive modulators, enhancing the use of large signals and overcoming range limits. In one embodiment, the method permits a range five times larger than in other systems.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server. A module may be a component of a device, software, program, or system that implements some "functionality", which can be embodied as software, hardware, firmware, electronic circuitry, or etc.

While preferred embodiments of the present invention have been described using specific terms, such description is for illustrative purposes only, and it is to be understood that changes and variations may be made without departing from the spirit or scope of the following claims.

What is claimed is:

1. A method for multiscale sampling for wide dynamic range electro-optic receivers, comprising steps of:
   obtaining an input signal;
   producing, using an optical modulator and detector, a first signal scaled at a first scale factor with respect to the input signal amplitude;
   producing, using the optical modulator and detector, a second signal scaled at a second scale factor with respect to the input signal amplitude; and
   correcting nonlinear distortions in a modulation and detection response using the first and second signals, wherein the first scale factor is different from the second scale factor.

2. The method according to claim 1, wherein the step of producing a second signal is performed by another optical modulator and detector.

3. The method according to claim 1, wherein the first and second signals are produced using optical polarization.

4. The method according to claim 1, wherein the first and second signals employ an optical filter.

5. The method of claim 1, wherein the step of correcting nonlinear distortions is performed by a computer readable program stored on computer readable medium.

* * * * *